INVENTORS
CHARLES E. FREESE
ROBERT D. EMERY
BY
Andrus & Starke
Attorneys

July 1, 1969   C. E. FREESE ET AL   3,453,420
PREDETERMINING COUNTER APPARATUS FOR FLOW CONTROL
SYSTEMS AND THE LIKE
Filed May 24, 1967   Sheet 2 of 4

INVENTORS
CHARLES E. FREESE
ROBERT D. EMERY
BY
Andrew F. Starke
Attorneys

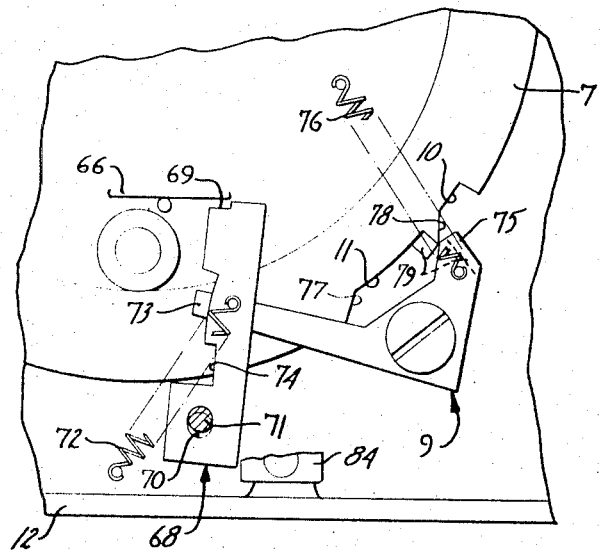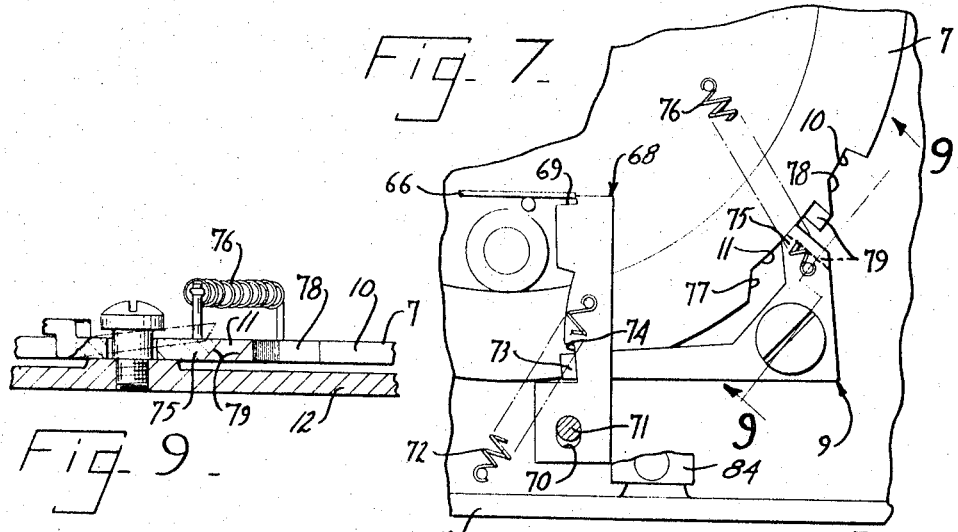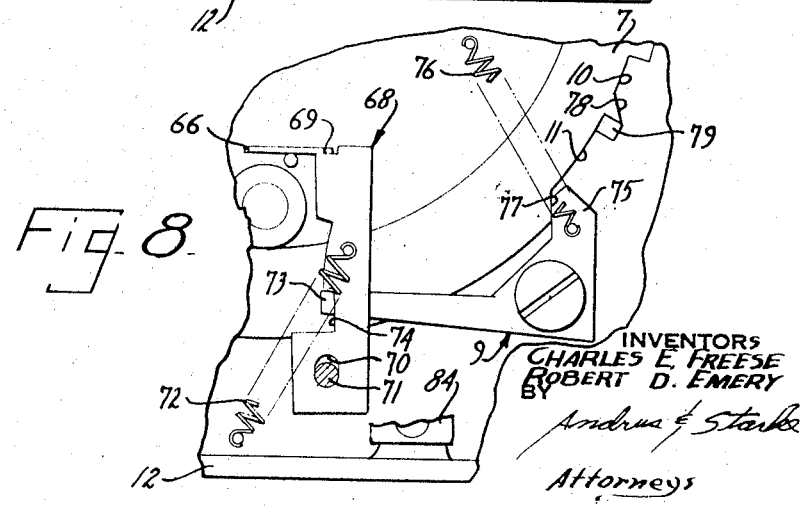

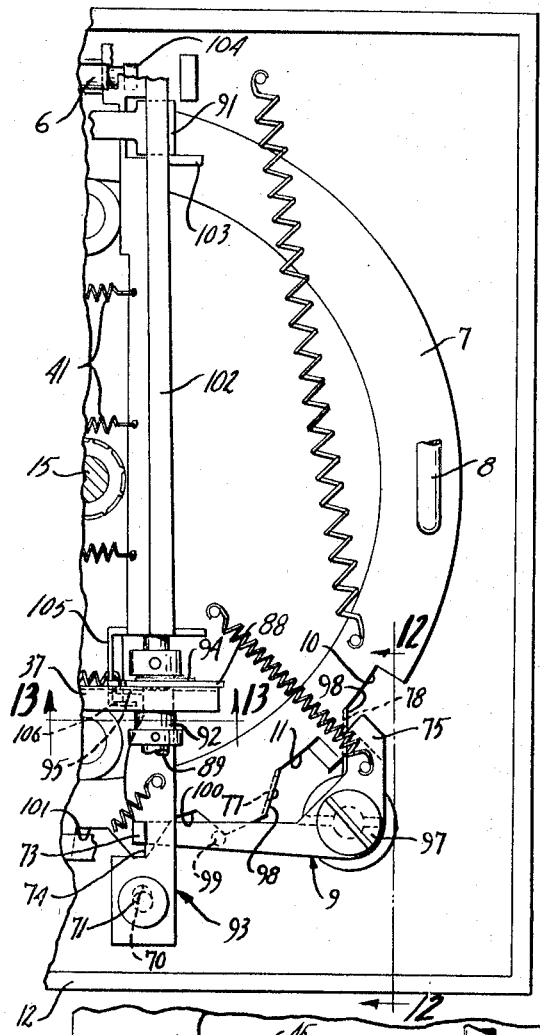

United States Patent Office 3,453,420
Patented July 1, 1969

3,453,420
PREDETERMINING COUNTER APPARATUS FOR FLOW CONTROL SYSTEMS AND THE LIKE
Charles E. Freese, Erie, and Robert D. Emery, North East, Pa., assignors to A. O. Smith Corporation, Milwaukee, Wis., a corporation of New York
Filed May 24, 1967, Ser. No. 640,956
Int. Cl. G06c 15/18
U.S. Cl. 235—132   23 Claims

ABSTRACT OF THE DISCLOSURE

A presettable counter includes a plurality of counter wheels rotatably mounted upon a support shaft. A unit order wheel is continuously driven in subtractive or countdown direction through a gear drive in accordance with a flow meter movement. The higher order wheels are connected for successive similar movement by an automatic cam tens advance coupling between immediately succeeding wheels. The cam advance includes a cam engaging a wheel setting pawl plate assembly and loading a spring. During each final portion of a revolution of the cam, the pawl assembly is released and a pawl drives the wheel one digit. The wheels are separately and independently preset from zero by a corresponding reciprocating rod. The rod carries a pawl which is spring loaded and allowed to move into engagement with a notch on a ratchet wheel causing the corresponding wheel to turn one digit. An automatic advance disengagement comb or tined member is pivotally mounted and engages the pawls to decouple the advance coupling. A trigger member is coupled by a lip and notch to the lowest order wheel and actuates a sear. A latch member is pivotally mounted and has one end connected to a catch on the sear and the other end biased into engagement with a rotatable control ring. The control ring connected to position a valve and in particular is spring loaded and provided with a pair of notches to first move a valve to a partially closed position and shortly thereafter to a fully closed position. When the flow valve is in the closed position, a member on a ring actuates a linkage to pivot the comb to the decoupling position and permits the individual setting of the wheels.

This invention relates to a predetermined or presettable counter apparatus for providing a mechanical movement upon obtaining a predetermined count. Counters of this variety are constructed to permit presetting of counter indicating wheels from a reference or zero position. The counter is then driven in a reverse or subtractive manner from such preset position and provides the necessary electrical or mechanical output when the count reaches a predetermined reference or zero.

The counter wheels are connected by an automatic tens advance such that the tens wheel moves a single digit or count for each complete revolution of the units wheel and so forth. A cam and ratchet drive for the tens advance mechanism has been employed to provide proper sequential drive. The ratchet drive is disconnected during the manual setting which permits individual setting of each digit wheel without disturbing the setting of the adjacent or any other digit wheel. The output member is suitably loaded and latched in an operating position with the counter preset from zero. A trigger assembly releases the member when the zero reference is established. A rotating output ring having internal latch notches in combination with a latch lever has been suggested.

The present invention is directed to presettable counters of the above type.

The leading surface of the second notch and the opposed surface of the tooth are provided with complementary ramps such that in the return movement, the latch lever pivots about an axis parallel to the plane of the ring, moves over the ring portion and returns to the first notch.

In accordance with the present invention, the higher order indicating wheels are connected by an automatic cam tens advance including releasably engaged members such as a pawl and ratchet assembly. During each final portion of a revolution of the preceding wheel, the pawl assembly is actuated to advance the wheel one digit. An automatic advance disengagement comb or tined member is pivotally mounted and engages the pawls to decouple the advance coupling. An automatic advance disengagement comb or tined member is pivotally mounted and engages the pawls to decouple the advance coupling. When a flow valve is in the closed position, a member on a ring actuates a linkage to pivot the comb to the decoupling position and permits the individual setting of the wheels. The wheels may then be separately and independently preset from zero by a corresponding input member. A particularly satisfactory preset system employs a pawl pivotally secured to a reciprocating input member. The pawl is spring loaded and allowed to move into engagement with a notch on a ratchet wheel secured to the indicating wheel causing the corresponding wheel to turn one digit.

A trigger member is coupled by a releasable connection such as a lip and notch to one of the wheels, normally the first or driven wheel. The trigger member is connected to mementarily move a trip member from its initial position to a sear trip position. The trip member is mounted to move into engagement with and pivot the sear and thereby release a latch member. The sear is pivotally mounted by a pin and slot connection to permit pivotal movement and translatory movement between the opposite ends of the slot. A resilient means continuously urges the sear to a first limit position in the slot. A latch lever is releasably coupled to the sear by a lip and notch type connection or the like to restrict the pivotal movement caused by the resilient means and to place the sear in the second limit position in the slot.

The latch lever is also releasably coupled to a control member which is preferably formed as a rotatable control ring having a pair of spaced notches to mate with a locking tooth on the latch lever. A resilient means loads the ring to a preselected given angular position or placement in which the tooth is rearwardly of the notches. The ring is reset to dispose the locking tooth in the first notch and thereby lock the ring in place.

A first actuation of the trip member releases the lever and the ring which rotates to a second locking position with the tooth engaging the second notch. To provide a more positive action, a follower or escapement device is connected to the latch lever and rides on a grooved portion of the ring. The grooved portion positively returns the latch lever to the second locking position as the ring rotates after being released. The second actuation of the trip member permits the ring to move to the preselected given position.

A friction brake arm is pivotally disposed adjacent a gear train and is connected to the advance disconnect mechanism. With the latter in the tens advance decouple position, the brake is resiliently forced into engagement with the gear, thereby preventing any movement of the gear train. This provides a simple and inexpensive means to eliminate errors normally associated with the backlash of a gear train from the drive unit to the unit wheel.

The drawings furnished herewith illustrate a preferred construction of the present invention in which the above advantages and features are clearly disclosed as well as

3 others which will be clear from the following description.

In the drawings:

FIG. 6 is a top fragmentary view showing the rotating ring latch and drive system as the latch member is released and the ring rotates to an intermediate position;

FIG. 7 is a view similar to FIG. 6 showing the ring in the position during the movement to the intermediate valve position;

FIG. 8 is a view similar to FIGS. 6 and 7 with the valve in the intermediate or second position;

FIG. 9 is a view taken generally on line 9—9 of FIG. 7;

FIG. 10 is a fragmentary view similar to a portion of FIG. 2 showing an alternative embodiment employing a positive escapement positioning of a latch member and a modified trigger assembly;

FIG. 11 is a side view showing the modified construction;

FIG. 12 is a view taken generally on line 12—12 of FIG. 10; and

FIG. 13 is a view taken generally on line 13—13 of FIG. 10.

Figures 1, 2:
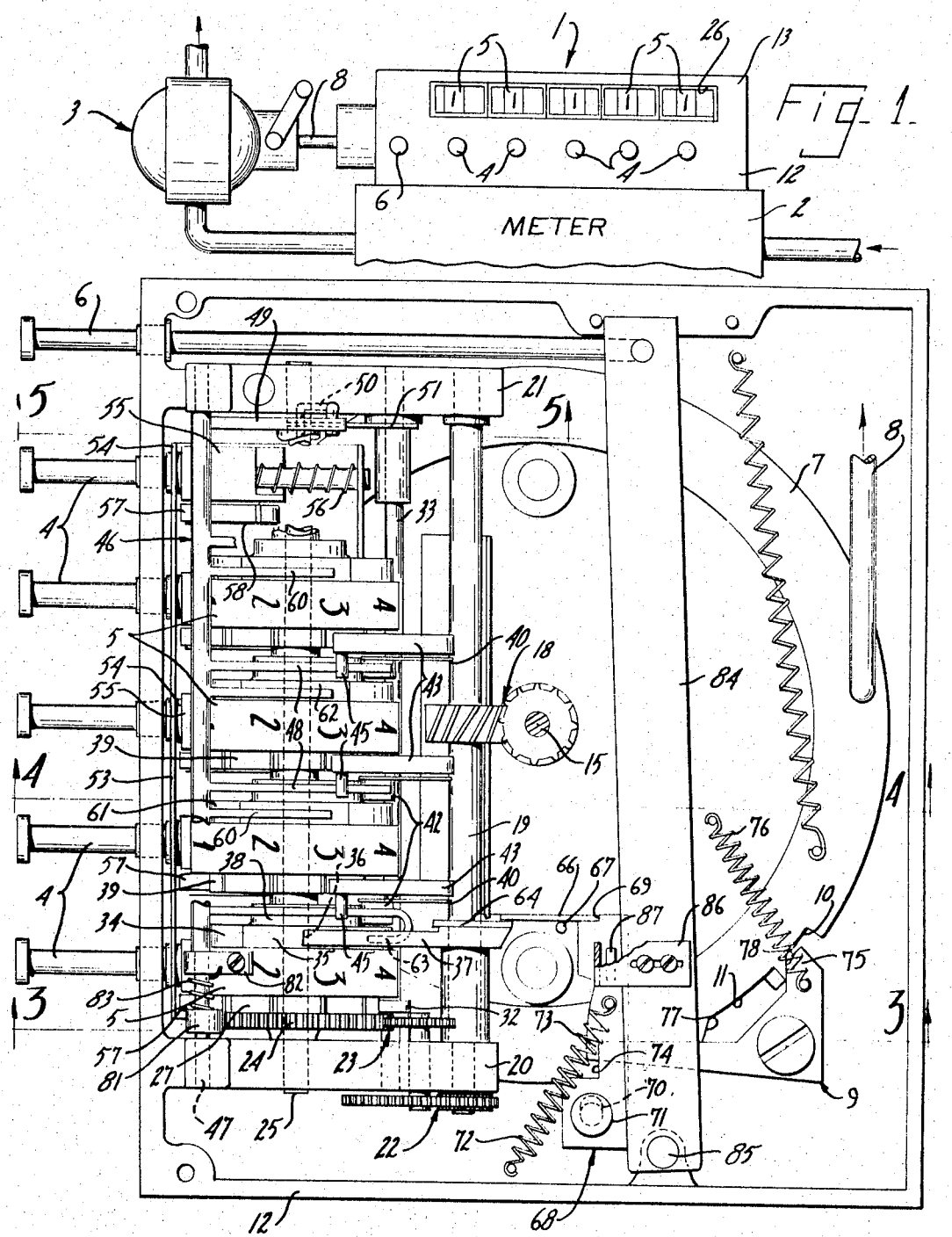
FIGURE 1 is a front elevational view of a flow system and presettable counter showing the general arrangement of the digit reading wheels and the digit preset operating shafts or rods.
FIG. 2 is an enlarged plan view showing the internal construction of the counter.

Referring to the drawings and particularly to FIGURE 1, the present invention is diagrammatically shown applied to a flow control system including a presettable counter 1 constructed in accordance with the present invention and interconnected to be driven from or by a meter 2. The meter 2 may be the usual volumetric flow recording meter connected in a flow line and coupled to the set stop counter 1 which is connected to control a flow valve 3. The presettable counter 1 includes a plurality of preset input members shown as reciprocating shafts or rods 4 projecting forwardly from the front of the counter and with each rod being aligned with one of a plurality of visual display or indicating wheels 5. In the illustrated embodiment of the invention, it is assumed that the display wheels read to a full unit and thus with the illustrated five display wheels can read to 99999.

The preset rods 4 are reciprocally mounted as hereinafter described and coupled to preset the individual associated display wheels 5 to any desired digit and thereby preset the counter 1 to any desired gallonage. An emergency stop rod 6 is provided to permit immediate closing of the valve 3 in case of emergencies.

The counter includes a spring loaded operating or control members shown as a control ring 7 rotatably mounted on the interior bottom or base of the counter 1 and interconnected by a link or connector 8 to the valve 3 which is manually opened. Opening of the valve 3 moves the link inwardly and rotates the control ring 7.

The control ring 7 is latched in a valve open position by a latch arm or lever 9 within the counter mating with a first full-flow notch 10 on the periphery of the ring 7. As illustrated, an immediately adjacent second partial-flow notch 11 is provided on ring 7.

In operation, as the preset counter 1 counts toward zero, the latch lever 9 is released shortly before a zero reference reading and releases the ring 7 which rotates until the lever 9 engages the second notch 11. In this position, the valve 3 is held in a partial flow condition

4 until the zero reference is reached at which time the latch lever 9 is again released, the ring 7 rotates and the valve 3 closes. This sequential operation minimizes shock load forces on the structure in the flow system in accordance with the desired procedure.

The illustrated presettable counter 1 includes a box-like two-piece housing having a shallow cup-shaped bottom portion 12 and a deeper inverted cup-shaped upper portion 13. The interior bottom wall of portion 12 is provided with a ledge 14 upon which the control ring 7 is mounted for rotation about a central axis. The side walls of portion 12 project upwardly and enclose the ring 7 while exposing the wheels 5 and associated drive of the counter mechanism. The interior mounting of the ring 7 provides protection therefor.

A vertical drive shaft 15 is centrally journaled within the bottom wall of housing portion 12 within a suitable bearing and includes a meter coupler 16 immediately beneath the bottom wall. A totalizer coupling gear 17 is secured to the upper end of the drive shaft for direct connection to a totalizer, not shown, if desired. The upper housing portion 13 is provided with a releasable top wall to permit mounting of the totalizer where required in accordance with known practice.

Display wheel drive gears 18 couple the central portion of the drive shaft 15 to a horizontal drive shaft 19 which extends laterally of the housing portion 12 and is journaled at the opposite ends in a pair of bearing and support walls 20 and 21 which project forwardly from the front wall of the housing portion 12 immediately to the opposite ends of the display wheels 5. Interconnected gear trains 22 and 23 couple the drive shaft 19 to an input gear 24 which is coupled through a one-way clutch, as hereinafter described, to drive the units indicating wheel 5. The other indicating wheels 5 are coupled for sequential and successive actuation through an automatic tens advance mechanism.

A wheel support shaft 25 is supported at the opposite ends in the bearing and support walls 20 and 21 in alignment with wheel display openings 26 provided in the front wall of the housing portion 13. The individual wheels 5 are rotatably supported on the shaft 25 in laterally displaced alignment to provide a visual display of the gallonage flow and of the preset for such flow in accordance with the usual decimal system.

Figure 3:
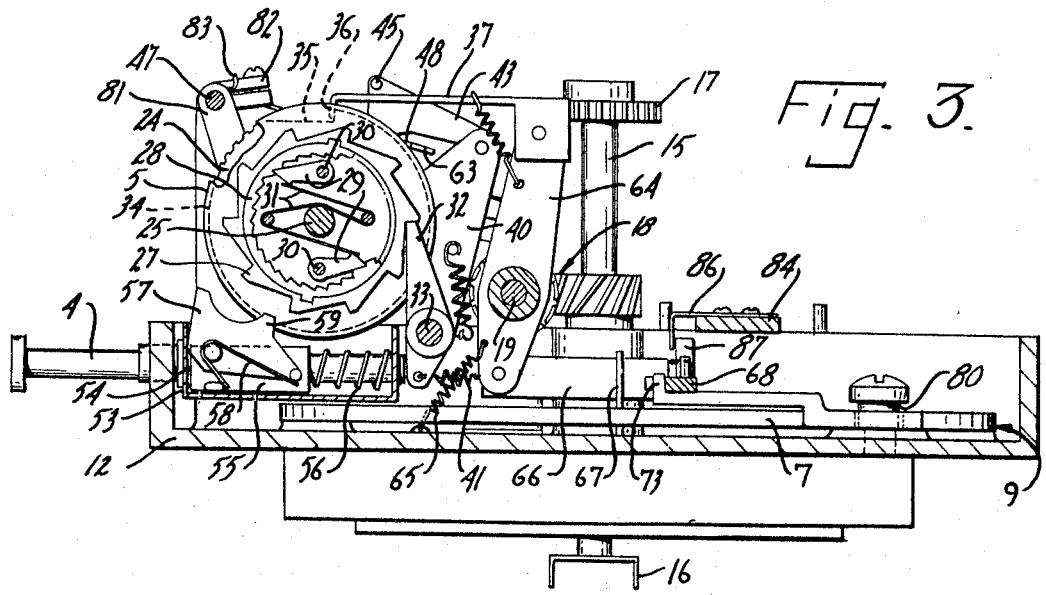
FIG. 3 is a view taken generally on line 2—2 of FIG. 2 and showing the unit order wheel drive.

Referring particularly to FIG. 3, the drive system for the units indicating wheel 5 is shown and briefly described as follows. A ratchet wheel 27 is secured to or integrally formed to one side of the wheel 5 and provided with an internal ring ratchet member 28. A pair of pawls 29 is secured to separate pivot pins 30 projecting from the gear 24 into the internal ring ratchet member 28. A flat spring 31 is bent around other similar pins with the opposite ends engaging and urging the pawls 29 into engagement with the teeth of the internal ratchet member 28. The rotation of the gear 24 in a counterclockwise direction is directly transmitted to the ratchet member 28, the wheel 27 and thereby directly to the units indicating wheel 5. For presetting, rotation of the wheel 5 is permitted by the ratcheting action of the pawls 29 which ride over the teeth in accordance with the usual ratchet function.

In the illustrated embodiment of the invention, the outer periphery of the ratchet wheel 27 is provided with ratchet teeth which cooperate with a spring loaded locking pawl 32 to provide a positive lock against reverse rotation of the units wheel 5. The locking pawl 32 is rotatably mounted upon a transfer pawl support shaft 33 which extends laterally between the bearing support walls 20 and 21 immediately in back of and below the wheels 5.

The unit wheel 5 is provided with a trigger ring member 34, which is shown integrally formed on the opposite face from the ratchet wheel 27. Member 34 is generally a cylinder slightly smaller than the diameter of the wheel 5 and provided with an actuating notch 35. The notch 35 is formed by the intersection of two perpendicular chordal lines to define a radial actuating surface adapted to engage a depending lip 36 of a trigger finger 37 which forms a part of the trigger assembly for actuating the lever 9 and closing of the valve in sequential steps.

A spiral cam 38 is secured to the end face of control member 34 and is coupled to drive the next succeeding order wheel; i.e. the tens indicating wheel in the illustrated embodiment.

Generally, each of the succeeding higher order wheels is similarly constructed and coupled to the preceding wheel by a tens advance mechanism and consequently only the tens wheel will presently be described in detail.

Figure 4:
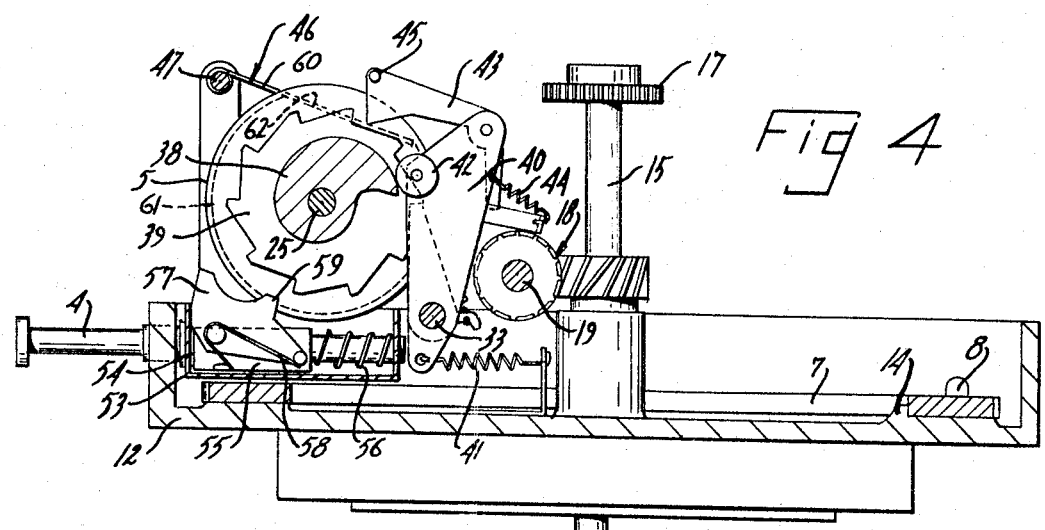
FIG. 4 is a view similar to FIG. 3 taken on line 4—4 of FIG. 2 showing one of the higher significant position wheels and the related drive mechanism.

Referring particularly to FIG. 4, the construction of the tens wheel and therefore the other wheels is shown and briefly described as follows. A ratchet wheel 39 is secured to the tens wheel. A pawl setting plate 40 is pivotally mounted on the shaft 33 in alignment with the ratchet wheel 39. A coil spring 41 is fixed to the housing portion and to the plate 40 below shaft 33. Spring 41 urges the plate 40 toward the cam 38. A follower 42 is secured adjacent to the edge of the plate 40 and rides on the periphery of the spiral cam 38. An advance pawl 43 is pivotally connected to the upper end of the pawl setting plate 40 and extends forwardly into overlying relationship with respect to the ratchet wheel 39. A spring 44 urges the outer end of the advance pawl 43 toward and into engagement with the periphery of the ratchet wheel 39.

During a complete 360° rotation of the spiral cam 38 in the illustrated embodiment of the invention, the first 324° serves to force the pawl setting plate 40 rearwardly, loading the spring 44. At 324° the point of the cam 38 moves past the follower 42 which drops or moves to the smaller radius of the cam thereby permitting the plate to move forwardly carrying the advance pawl forwardly and setting the digit wheel one notch. The wheel 5 is advanced to the next lower digit in the reverse counting sequence.

The other wheels 5 are similarly constructed and coupled through cam and pawl assemblies to provide automatic tens advance.

As previously noted, the wheels are to be individually presettable. A pin 45 on the pawl 43 overlies a portion of comb 46 for releasing the pawl during presetting of the wheel. A comb shaft 47 extends laterally to the front and top of the wheels 5 between the bearing and support walls 20 and 21. The comb 46 is an integral member rotatably mounted on the shaft 47 with a pawl lift finger or tine 48 aligned with and disposed below each of the pins 45 of advance pawls 43. When the comb 46 is pivoted counterclockwise as viewed in FIGS. 2 and 3, the several tines 48 lift the pivotally mounted spring loaded pawls 43 upwardly above the level of the corresponding ratchet wheels 39. Rotation of the spiral cam 38 loads the advance pawl setting plate 40 and causes reciprocation of the advance pawl 43, but the latter does not engage the ratchet wheel 39 and consequently there is no advance.

Figure 5:
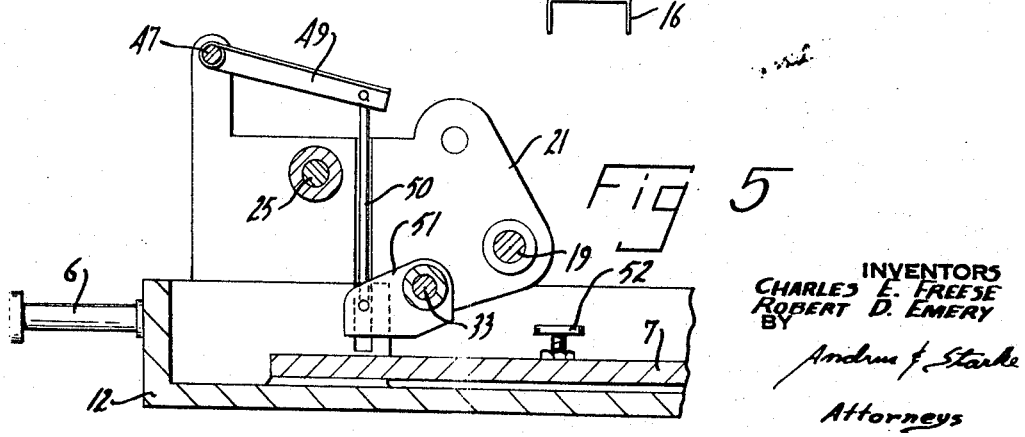
FIG. 5 is a view taken generally on line 5—5 of FIG. 2 and showing a disconnect linkage for the tens advance drive.

In accordance with the illustrated embodiment of the present invention, the comb 46 is positioned to disengage the advance pawls 43 through a linkage connection to the locking or control ring 7 as shown in FIG. 5.

An arm 49 is secured to the comb 46 and projects laterally into the housing. The outer end of the arm 49 is connected to a link 50 which extends downwardly and is pivotally connected at the lower end to a lever 51. The lever 51 is journaled on the shaft 33 and positioned over a portion of the control ring 7. A cam member 52 is secured to the ring 7 and aligned with the lever 51 with the ring in the valve closed position. The cam member 52 is set to raise the lever 51 and pivot the linkage and interconnected comb 46 in a counterclockwise direction, as viewed in FIGS. 3 and 4, to lift the comb tines 48 upwardly and pivot pawls 43 clockwise to the decoupled position. In this position, the several wheels 5 can be individually preset to any desired position without affecting any of the other wheels.

Each of the wheels 5 is individually and separately set by reciprocation of the preset rod 4 in the following manner; the description being particularly related to the illustration of FIG. 3 for the units wheel.

A common channel 53 is secured to the bottom wall of the housing portion 12 immediately above the level of the ring 7 and projects laterally beneath all of digit wheels 5. The rods 4 are reciprocally mounted within openings in the side walls of the channel 53 and project outwardly through the front wall of the housing. A retaining ring 54 is secured to the rod 4 immediately inwardly of the front wall of the channel 53. The retaining ring prevents withdrawal of the rod 4 from the channel and also acts as a stop acting against a wheel set pawl carrier 55 which is slidably mounted on the shaft or rod 4. A coil spring 56 encircles the rod between the carrier and the back wall of the channel thereby resiliently loading it on the rod 4. A pawl 57 is pivotally secured to the carrier 55. A hairpin spring 58 encircles the pivot connection and acts between a stop on the carrier and a stop on the pawl 57 and continuously urges the pawl to rotate in a counterclockwise direction as viewed in FIG. 4. A pawl projection or tip 59 is disposed in alignment with and just below the ratchet wheel 27, or wheel 39 in the case of the higher order wheels 5, on the face of the corresponding digit wheel 5, as heretofore described.

With the tens advance mechanism disengaged, the rod 4 for the corresponding wheel 5 may be manually pushed inwardly; forcing the carrier 55 and attached pawl 57 toward the back portion of the channel. When the carrier 55 moves from the front wall of the channel, the pawl 57 pivots in a counterclockwise direction about its pivotal connection under the action of the spring 58. The tip 59 rotates upwardly and into engagement with a notch or tooth in the outer periphery of the ratchet wheel 39. The complete inward movement establishes one digit stepped movement of the associated digit wheel. All of the wheels are similarly and individually preset to permit predetermined flow.

When the valve 3 is actuated to the open position, the ring 7 rotates and the cam bolt 52 disengages the comb linkage, whereupon the comb 46 pivots downwardly and releases pawls 43.

A stop control finger or tine 60 is integrally formed as a part of the pawl lift finger or tine 48 for simultaneous and corresponding pivotal positioning. The tines 60 are aligned with a cam portion or member 61 secured to the face of the higher order wheels in the same manner as the notched trigger ring member 34 is secured to the unit digit wheel 5. Each cam member 61 is a cylinder with a chordal surface or notch 62. With any tine 60 riding on the outer periphery of the corresponding cam member 61, the pawl lift fingers or tines 48 are lifted but insufficiently to hold the automatic advance pawl 43 from operative engagement with its ratchet wheel 39. In operation, the wheels 5 are therefore driven to the reference position, assumed herein to be a zero reading, to move the trigger finger 37.

The trigger finger 37 is spring loaded to engage member 34 and is positively disengaged from cam member 34 during the previous countdown of the wheels 5 through a lateral hook or lift extension 63 on the tine 48 of the tens order wheel.

As the preset counter 1 approaches zero all of the higher order wheels 5 are at zero and the comb 46 drops to release the trigger finger 37 with lip 36 riding on the member 34 and permitting the lip 36 to move into operative engagement with the trigger or actuation notch 35, as shown in FIG. 3. As the unit order wheel 5 continues to rotate from that position, the trigger finger 37 is pulled forwardly to actuate the trigger assembly and particularly a spring loaded crank 64.

The trigger assembly includes the crank 64 journaled on the drive shaft 19 and extended vertically with the upper end connected to finger 37 and with the lower end terminating immediately above the level of the control ring 7. A crank spring 65 urges the crank 64 counterclockwise in FIG. 3 against such movement and returns the crank to the position of FIG. 3 when the wheel notch 35 moves past the lip 36. The finger 37 therefore imparts a single oscillatory movement to crank 64. A trip member shown as a plate-like bar 66 is pinned to the lower end of the crank 64 and extends laterally rearwardly past a guide pin 67 projecting upwardly from the bottom housing wall.

A sear 68, also a plate-like member, is mounted parallel to the bottom wall and extending at right angles to the trip bar 66. The outer end of the sear 68 includes a notch or recess 69 mating with the outer end of the trip bar 66 with the ring and the valve in full open position, as shown most clearly in FIG. 2. The opposite end of the sear 68 is pivotally mounted and includes a pivot slot 70 mating with a pivot pin 71 projecting upwardly from the bottom wall through the slot. A coil spring 72 is secured between the bottom wall and the sear 68 and continuously urges the sear counterclockwise in FIG. 2 and to a retracted position in slot 70 to a first limit position with the sear notch 69 spaced from the end of trip bar 66. The outer end of the latch lever 9 is bent upwardly to form a lip 73 which engages a latch lever notch 74 in the sear 68 and holds the sear in engagement with the trip bar in a second limit position with the pin 71 engaging the opposite end of the slot, as shown in FIG. 2.

The latch lever 9 is an L-shaped member pivotally mounted at the junction of the two legs or arms with the latching leg terminating in lip 73 and the opposite locking leg terminating in the locking tooth or projection 75. The locking tooth 75 is biased into engagement with the outer peripheral edge of the ring 7 and thus into notches 10 and 11 by a coil spring 76 connected to the latch lever 9 and extending over the control ring 7 with the opposite end fixed to the bottom wall of the housing. The notch 11 is substantially greater in length than the corresponding dimension of the tooth 75 to insure dropping of the tooth therein during the rotation of the ring 7. The trailing ends of the notches 10 and 11 are similarly formed with cammed inclined edges 77 and 78, respectively, in the plane of the control ring. The first notch 10 is just slightly larger than the projection 75 and the tension on the control ring 7 holds the inclined edge 77 in engagement with the projection tooth 75 and exerts a pivotal force tending to turn the latch lever 9 in the clockwise direction, as shown in FIG. 2. In this position of FIG. 2 and with the sear 68 locked against rotation by the latch lever lip 73 disposed within the sear notch 74 such pivotal movement is prevented.

The sequential movement of the sear 68 and latch lever 9 in response to actuation of the trigger finger 37 is shown most clearly in FIGS. 6–8. When the trip bar 66 is forced rearwardly towards the sear 68, it pivots the sear and disengages the lever 9. The ring 7 is free to rotate and the latch lever 9 pivots to the position shown in FIG. 7 as a result of rotation of the ring 7. Spring 72 retracts the sear 68 with the latch lever lip 73 positioned outwardly of the notch 74. The control ring 7 rotates and the projection 75 rides up and over the portion of ring 7 between the notches 10 and 11 and then drops into the second notch 11 as a result of the force of the spring 76 and establishes the position shown in FIG. 8. When the projection 75 drops to the bottom of the second notch 11, the opposite end of lever 9 pivots counterclockwise into the lever notch 74 of the sear 68. As the ring 7 continues to rotate, the projection 75 engages the inclined edge 78 and begins to ride up the edge. The lever 9 pivots clockwise slightly until the lip 73 on the opposite arm again engages the locking edge of the notch 74, forces the sear 68 upwardly with the trip bar 66 returned to the original position by crank spring 65 and mating with the notch 69 in the outer end of the sear and establishes the position of FIG. 8. The first actuation of the trigger finger 37 provides a momentary release setting of the trip lever which automatically resets to the second position shown in FIG. 8.

The next rotation of the units indicating wheel 5 provides a second similar movement of the trigger finger 37 to similarly actuate the trigger assembly, release the latch lever 9 and permit the control ring 7 to again rotate. The second release permits valve 3 to fully close.

The valve 3 is closed and the counter 1 is at the zero reference reading. The control ring 7 is now positioned with cam member 52 aligned with the comb linkage lever 51 to lift the comb 46 and thereby operatively disengage all of the advance pawls 43 from the associated ratchet wheels 39 to again permit individual and separate resetting of the individual wheels 5.

When the valve 3 is again opened, the ring 7 rotates in a clockwise direction to release the comb 46 and to dispose the locking projection or tooth 75 into locking engagement with the first notch 10, as shown in FIG. 2.

As most clearly shown in FIG. 9, the return movement of the latching lever 9 over the portion between the two notches 10 and 11 results as follows. The back wall of the projection 75 and the front or leading wall of the notch 11 are provided with complementary inclined surfaces 79 extending axially of the ring 7 such that the plane is at an angle to the plane of the ring. Further, in the latch lever 9 is pivotally mounted for pivoting in the plane of the ring 7 by a bolt-type pin having a slight space 80 between the head of the pin and the latch lever 9. The coil spring 76 and the sear 68 serve to normally hold the latch lever 9 in a lowermost plane in alignment with the locking ring 7. However, during the return or closing movement of ring 7, the inclined surfaces 79 cam the tooth 75 up and over the ring portion between the notches 10 and 11 with the lever 9 pivoting about an axis generally parallel to the plane of the ring and with the tooth 75 dropping into the first notch 10 to establish the locking position of FIG. 2.

In the illustrated embodiment of the invention, the gear trains 22 and 23 are resiliently loaded by a friction brake 81 during the setting of the wheels 5 to eliminate the errors normally associated with backlash in the gear train. As shown most clearly in FIGS. 2 and 3, brake 81 is generally a block shoe member floating on the comb shaft 47 in alignment with input gear 24. A brake adjuster 82 in the form of a C-clamp is fixed to the comb shaft 47 in axially spaced relation to the brake 81. A coil spring 83 encircles the comb shaft 47 between the brake 81 and the brake adjuster 82 with the opposite ends respectively secured to the brake and brake adjuster. The brake adjuster 82 is positioned to provide a predetermined spring force urging brake 81 into frictional sliding engagement with the input gear 24. When the comb 46 is lifted to disengage the tens advance, the brake adjuster 82 is similarly lifted increasing the tension on the brake spring 83 and forcing the brake 81 against the driven gear preventing any movement of the gear during the presetting operation. During operation, the spring force is essentially eliminated and permits free movement of the gear 24.

In the illustrated embodiment of the invention, the emergency stop rod 6 is connected to directly actuate the sear 68 to release latch lever 9, as follows. An emergency trip plate 84 is pivotally connected to the emergency stop rod 6 at one end and extends laterally across the housing with the opposite ends pivotally mounted as at 85 to the opposite housing wall. A bracket 86 is secured to the emergency trip bar 84 and overlies an upwardly projecting lip 87 on the sear 68. With the emergency stop rod 6 held in, the trip plate 84 pivots and positively moves and holds the sear 68 to the release position shown in FIG. 6. This permits the control ring 7 to move past both notches 10 and 11 to the full stop position. Thus, the sear 68 is not allowed to return to the latching position with respect to the latch lever lip 73.

The operation is briefly summarized as follows. The presettable counter 1 is preset to read any predetermined amount up to the maximum reading permitted by the counter. The valve 3 is then opened and in so doing positively positions the control ring 7 with the latch lever 9 engaging the first notch 10, thereby holding the ring in the latched position. As the counter 1 rotates towards zero, the several digit wheels 5 are properly positioned to permit the comb 46 to drop to the release position and operatively couple the trigger finger 37 to the cam member 34 of units wheel 5. The resulting movement of trigger finger 37 actuates sear 68 to release the lever 9 and therefore control ring 7 which rotates until lever 9 moves to the second notch 11. This reduces the flow rate. As the unit order wheel 5 slowly rotates and again aligns the notch 35 with the trigger finger 37, the second release of the latch lever 9 occurs and the ring 7 rotates to the fully stopped position with the valve 3 closed.

The illustrated embodiment of the invention described above relies on the particular spring forces and speed of the control ring 7 and valve operator. A positive escapement modification to the control ring and the latch lever is shown in a second embodiment of the invention in FIGS. 10–13 which also includes a modification to the connection of trigger finger 37 to latch lever 9 and only the changes to the structure are shown and described in detail, the elements common to the first embodiment being similarly numbered.

Referring particularly to FIGS. 10 and 11, the control ring 7 is rotatably mounted within the lower housing portion generally similar to that in a manner shown in the previous embodiment. The display wheels 5 are similarly mounted within the housing and connected through a similar drive system to a vertical drive shaft 15. The wheels 5 are similarly preset and interconnected by a suitable tens advance mechanism as previously disclosed. The trigger finger 37 which is generally similar to that shown in the previous embodiment similarly rides on a ring member 34 forming a part of the units wheel 5.

In the embodiment of FIGS. 10–13, the trigger finger 37 is connected to a crank 88 journaled on a shaft 89 monuted behind the vertical drive shaft 15 and extending laterally across the housing in spaced relation to the wheels. The shaft 89 is supported in its opposite ends in suitable hub supports 90 and 91 integrally connected and extending forwardly from the bearing support walls 20 and 21. The crank 88 is rotatably mounted on the shaft 89 with suitable collars 92 disposed to the opposite sides thereof to prevent axial movement while permitting free pivotal movement of the crank.

The shaft 89 is located generally in overlying alignment with a sear 93 which is constructed in essentially the same configuration as that shown in the previous embodiment. As most clearly shown in FIG. 12, a plate 94 is connected to the side of the crank 88 and depends therefrom terminating in a laterally extending actuating lip 95 aligned with the outer end of the sear 93. The sear 93 is mounted in a manner essentially corresponding to that of the previous embodiment and interconnected to the latch lever 9 in a similar manner. The latch lever in turn is a generally L-shaped member similar to that of the previous embodiment.

Referring particularly to FIG. 11, the mounting of the latch lever 9 in the second embodiment is modified somewhat to permit the pivotal movement about an axis in the plane parallel to the control ring. The lever 9 is formed with the latching leg or arm generally in a plane above the plane of the locking leg or arm. The common junction portion is thus similarly stepped to the opposite sides of a latch lever pivot bolt pin 96 and particularly with respect to the pin head 97. The latching leg abuts the head 97 but is spaced from the bottom wall portion and the locking leg is disposed downwardly and generally rests on the bottom wall portion. During the return movement of the ring 7 to the valve open position, the lever 9 is once again allowed to pivot, as the complementary inclined surfaces 79 on the leading edge of the second notch 11 and the opposed edge of the projection 75 moves past each other because of the oppositely disposed offsets adjacent the pin 96.

In the second embodiment, the cammed inclined edges 77 and 78 of the notches 10 and 11 are provided with upper overlying ledges 98 and the corresponding inclined surface of the projection 75 is notched or recessed to mate therewith and prevent raised movement of the latch lever 9 during the closing of the valve 3.

Additionally, the latch lever 9 is positively positioned during the closing of the valve 3 as follows. A follower pin 99 is secured to the latch lever 9 and aligned with the portion of the control ring 7 following or trailing the notches 10 and 11. The control ring 7 is provided with contoured spaced edge grooves 100 and 101 in the peripheral portion adjacent the normal position of the follower pin 99. When the latch lever 9 is released and the control ring 7 rotates, it simultaneously causes the pin 99 to ride down the leading edge of the groove 99 permitting the lever movement. As ring 7 continues to rotate, the pin 99 engages the trailing edge of the groove 100 and rides up the groove positively pivoting the latch pin 99 in the opposite or counterclockwise direction and causes the latch lever 9 to return and lock up with the sear 93 before the edge 78 of the second notch 11 engages the locking projection 75 of the lever 9. This establishes the intermediate position of the mechanism as previously shown in FIG. 7.

When the trip finger 37 again actuates the trip assembly to release the sear 93, the pin 99 is allowed to ride down the second groove 101 and the latch lever 9 releases the control ring 7 allowing it to go to the fully closed position.

The escapement feature of the structure shown in FIG. 10 provides a more positive operating mechanism independent of the speed of the valve actuator. Thus, there is relatively rapid operation of the actuator and under certain conditions a relatively critical balance may otherwise be required between the several springs connected to the control ring, the latch lever and the sear to provide the degree of reliability required in set stop counters and the like.

The emergency stop mechanism shown in FIG. 10 is modified slightly to reflect the difference in the trigger assembly. An angled plate 102 is secured to the shaft 89 and extends laterally across the housing between the inner end of the emergency stop rod 6 and the trigger assembly. End plates 103 are secured to the L-shaped plate to provide a support for the plate on the shaft. The lower end of the plate 102 is spring loaded by the springs 41 interconnected to the pawl setting plates 40 of the tens advance mechanism. This biases the plate in a clockwise direction as viewed in FIGS. 11 and 13.

The end of the plate 102 in alignment with the stop rod 6 is provided with an opening through which the stop rod 6 extends and is secured in place by a bolt 104 or other suitable device threaded into the terminal end of the rod.

The opposite end of the plate 102 includes an L-shaped extension 105 integral with the bearing plate 103 which extends axially of the shaft 89 beneath the actuating lip 95 of the crank 88 and then upwardly to define an upstanding lip 106 in front of the sear 93. Inward movement of the emergency rod 6 pivots the actuating plate 102 in a counterclockwise direction and the upstanding lip 95 positively forces the sear 93 to pivot to release the latch lever 9 and permit movement of the assembly in the same manner as previously described.

The embodiment of the invention illustrated in FIGS. 10–13 therefore operates in essentially the same manner as that previously described. The trigger assembly mechanism is simplified and the positioning and holding of the latch lever 9 is positively established to insure repeatable long life, reliable operation of the latch system. The follower pin 99 on the latch 9, in particular, provides a positive movement of the latch lever and eliminates problems of relative spring balance and speed of movement of the control ring.

The present invention thus provides an improved control for a presettable counter including means permitting independent and individual adjustment of the counter wheels.

Various modes of carrying out the invention will be readily apparent to those skilled in the art without departing from the spirit of the invention.

We claim:

1. A presettable counter mechanism having a plurality of indicating wheels operatively connected to be driven from one wheel, a loaded control member coupled to the wheels by a trigger assembly for release in response to a reference reading of the counter wheels, the improvement in a trigger assembly for said control member comprising a latch lever pivotally mounted adjacent the control member and coupled thereto by a locking notch and tooth engagement means, a sear member mounted adjacent said lever, a releasable connection connecting said sear member to said lever, said sear member being mounted to pivot about a pivot axis with respect to said lever and disengage said releasable connection and to move with respect to said pivot axis between a first limit position and a second limit position, a resilient means coupled to said sear member and urging the sear to said first limit position and holding said sear and lever in engagement and thereby preventing pivoting of the lever and movement of the control member, said lever holding said sear in the second limit with respect to said pivot axis, a trip member mounted for releasable engagement to said sear with the sear in the second limit position and disengaged in the first limit position, said trip member being movable to pivot said sear against said resilient means and releasing said lever and permitting movement of the control member in response to movement of the sear by said trip bar, said sear moving to the first limit position and releasing of said sear from said trip member for independent pivotal movement, means connecting the trip bar to said counter wheels and momentarily moving the trip bar to the trip position in response to movement of the counter wheels to a reference position, and means on said control member cooperating with said latch lever to reset the latch lever and sear to the second limit position to engage the trip member.

2. The presettable counter mechanism of claim 1 wherein said releasable connection includes engageable notch member and a lip member forming portions of the latch lever and the sear member, said lip member being disposed within the notch with the sear in the second limit position and the latch lever in locking engagement with the control member.

3. The presettable counter mechanism of claim 1 having a housing for said counter mechanism and said control member is a rotatable ring mounted on the interior bottom wall of the housing.

4. The presettable counter mechanism of claim 1 wherein said engagement for said latch lever includes a locking tooth and said control member includes said locking notch and a second trailing locking notch, said locking tooth being disposed within the first locking notch and said control member moving to align the tooth with the second notch and establish a second locking position in response to a first release movement of the trip member having cooperating escapement members secured to the control member and latch lever to positively position the latch lever in said second locking position in response to the first step movement of the control member.

5. The presettable counter of claim 1 wherein said control member is a rotatable ring mounted on the interior bottom wall of a housing, said ring having a first notch and a second notch in the outer peripheral surfaces, said notches being closely spaced and each having an inclined trailing edge, said latch lever being a generally L-shaped member having a locking leg terminating in said locking tooth and a latching leg, a pivotal mount connected to the junction of the legs and permitting first pivoting with respect to said notches and second pivoting axially of said ring, means biasing the locking leg into engagement with said outer edge and into said notches, said locking tooth having an inclined edge complementing the inclined trailing edge of said notches, and the leading edge of the second notch and the opposed edge of the locking tooth having complementing cam ramps.

6. The presettable counter of claim 1 including a mounting pin secured to the housing, said sear being a plate-like member having a pivotal mounting slot in one end portion mating with said pin, said sear extending from said pin generally perpendicular to the latch lever and having the edge notched to receive a projecting lip on the lever, the trip member being reciprocally mounted with the one end mating with the outer end of the sear and operable to pivot the sear against the force of said resilient means connected to the sear and thereby release the latch lever and move the sear to said first limit position.

7. The presettable counter of claim 1 wherein said control member is a rotatable ring having a first locking notch and a second locking notch in a peripheral surface, each notch having an inclined trailing edge, said latch lever being a generally L-shaped member having the locking tooth on a first leg and a latching leg and pivotally mounted at the junction of the legs, means biasing the locking leg into engagement with said outer edge and into said notches, said sear being a plate-like member having a slot and pin pivotally mounted to one end portion, said sear extending from said pivotal mount generally perpendicular to the latching leg of the latch lever and the releasable connection to the lever including a lip and notch connection, and the trip member being mounted with the one end engaging the outer end of the sear and operable to pivot the sear against the force of the resilient means connected to the sear.

8. The presettable counter of claim 7 wherein said second notch has a length substantially longer than the corresponding length of the locking tooth.

9. The presettable counter of claim 1 wherein said control member is a rotatable ring mounted on the interior bottom wall of a housing, said ring having a first notch and a second notch in the outer peripheral edge, said notches being closely spaced and each having an inclined trailing edge, said latch lever being a generally L-shaped member having a locking leg terminating in the locking tooth and a latching leg and pivotally mounted at the junction of the legs, a first spring connected to the housing and the lever and biasing the locking tooth into engagement with said outer edge and into said notches, a mounting pin secured to the housing, said sear being a flat plate-like member having a pivotal mounting slot in one end portion mating with said pin, said sear extending from said pin generally perpendicular to and over the latching arm of the latch lever and having the edge notched to receive a projecting lip on the locking arm, the resilient means coupled to the sear holding the sear in the locking position and preventing pivoting of the latch lever under the force of the control ring, and the trip member being reciprocally mounted with the one end mating with a recess in the outer end of the sear and operable to pivot the sear against the force of said last-named resilient means.

10. The counter mechanism of claim 9 wherein the leading edge of the second notch is formed as an inclined ramp with the plane of the ramp at an angle to the plane of the control ring, said tooth of said latch lever having a complementing ramp on the surface opposed to said first ramp with the projection in said second notch.

11. The presettable counter of claim 1 wherein said notch and tooth engagement means is with the edge of the control member, said control member having a pair of similar notches of said engagement means and said latch lever having the locking tooth riding on said edge, said latch lever being pivotally mounted for pivoting about an axis in a plane parallel to the control member and about an axis normal to the plane of the control member, said lever pivoting about said first axis in response to actuation of said trip member, said tooth and the second notch having camming surfaces to pivot the lever about said second axis with the reverse movement of said control member as the portion of the member between said notches moves past said locking tooth.

12. The counter mechanism of claim 1 wherein said control member is a rotatable ring and includes a pair of adjacent outer peripheral notches having a trailing inclined peripheral cam edge, the leading edge of the second notch being an inclined ramp extending at an angle between end faces of the ring, said latch lever being L-shaped and having the locking tooth riding on the outer periphery of the ring, said tooth having an inclined complementing surface on the side mating with said cam edges and having a complementing ramp on the opposite side.

13. The counter mechanism of claim 1 wherein said control member is a rotatable ring and includes a pair of adjacent outer peripheral notches having a trailing inclined peripheral cam edge, said latch lever being centrally pivoted and having the locking tooth on one side of the pivot riding on the outer periphery of the ring, said locking tooth having an inclined complementing surface on the side mating with said cam edges, and a follower secured to the lever to the opposite side of the pivot and riding on the adjacent periphery of the ring, said ring having a pair of spaced guide grooves for said follower and providing a positive movement of said locking projection into said second notch.

14. The counter mechanism of claim 1 wherein said control member is a rotatable ring and includes a pair of adjacent outer peripheral notches having a trailing inclined peripheral cam edge, the leading edge of the second notch being an inclined ramp, said latch lever being L-shaped and having the tooth riding on the outer periphery of the ring, said tooth having an inclined complementing surface on the side mating with said cam edges and having a complementing ramp on the opposite side, and a follower pin secured to the opposite arm of the lever and riding on the adjacent periphery of the ring, said ring having a pair of spaced guide grooves for said follower and providing a positive movement of said locking tooth into said second notch.

15. The presettable counter of claim 1 including the improvement wherein the indicating wheels are sequentially actuated with each wheel coupled to an immediately preceding wheel by an advance mechanism having releasable coupling members, disengage means having a disengage position for simultaneously disengaging all of said coupling members, and operating means forming a part of said control member and coupled to said disengage means with the control member in a preselected position to place said last-named means in the disengage position.

16. The counter of claim 15 wherein said trip member is coupled to a related indicating wheel by second releasable coupling members and said disengage means is connected to disengage the second releasable coupling members in said disengage position.

17. The presettable counter of claim 15 wherein said control member is a rotatable ring member, said disengage means includes a linkage engaging said coupling members, and said operating means includes a cam member secured to said control ring and coupled to the linkage with the control ring in a preselected position.

18. The presettable counter of claim 1 wherein said succeeding order indicating wheels are coupled to the preceding wheel by a ratchet wheel secured to the wheel and a spring loaded pawl actuated by a cam on the preceding wheel, said pawls having lift pins projecting therefrom, a pivotal mounted comb member having a plurality of integral tines disposed beneath said pawl pins and having a first position spaced from said pins and a second position engaging said pins and lifting said pawls from operative engagement with the corresponding ratchet wheels, a linkage connected to said comb member and having a pivotally mounted input lever positioned over the control member, and a cam member secured to the control member and projecting upwardly into the plane of said lever, said control member having one position wherein said cam member engages and positions said lever to place the comb member in said second position.

19. The presettable counter of claim 1 wherein said indicating wheels are mounted in laterally spaced horizontal array and succeeding order wheels are coupled to the preceding wheel by a ratchet wheel secured to the wheel and a spring loaded pawl actuated by a cam on the preceding wheel and having lift pins projecting therefrom, a trigger finger pivotally mounted to the opposite side of one wheel and extending forwardly over the same wheel, said wheel having a trigger member releasably coupled to a side trigger finger, a comb member pivotally mounted to the front and top side of said indicating wheels and having a plurality of integral tines disposed extending over the wheels and beneath said pawl pins and said trigger finger and having a first position spaced from said pins and a second position engaging said pins and trigger finger and lifting said pawls and trigger finger from operative engagement, a linkage connected to said comb member and having a pivotally mounted input lever positioned over the control member, and a cam member secured to the control member and projecting upwardly into the plane of said lever, said control member having one position wherein said cam member engages and positions said lever to place the comb member in said second position.

20. A presettable counter having a plurality of indicating wheels including a first lowest order driven wheel and a plurality of successive higher order wheels, each of said wheels being rotatable through a plurality of indicating positions and transfer means releasably connecting each wheel to a next higher order wheel whereby the wheels are interconnected for sequential operation, a plurality of devices for individually setting said wheels to any of their positions of rotation relative to a selected indicating reference position, the improvement in the counter comprising a control member coupled to one of the wheels and actuated by the sequential repositioning of all of the wheels in the selected indicating reference position, and reset means on the control member and said transfer means disengaging the transfer means between the wheels in response to a preselected actuation of the control member and thereby permitting individual setting of the wheels.

21. The presettable counter of claim 20 wherein the coupling of the control means to the one wheel includes a releasable trip connection, and the means coupling the control means to said transfer means includes means coupled to the releasable trip connection to disengage the transfer means and the trip connection in response to the preselected actuation of the control means.

22. The presettable counter of claim 20 including the further improvement wherein each of the devices for setting of said wheels includes ratchet teeth on the side of the wheel, a reciprocating shaft slidably mounted for movement past the wheel, a pawl rotatably secured to the shaft, a resilient means secured to the pawl and urging the pawl to rotate and dispose the pawl in the plane of the teeth, said pawl abutting a stop member in said housing in the standby position of the shaft.

23. The presettable counter of claim 20 wherein said control means in a control ring having a raised camming surface, said transfer means includes a plurality of advance pawls, a linkage connected to said advance pawls and having an input element in the path of said camming surface, said input element being moved by said camming surface to disable said advance pawls.

References Cited

UNITED STATES PATENTS

| | | | |
|---|---|---|---|
| 2,904,125 | 9/1959 | Hazard et al. | 235—132 |
| 3,057,553 | 10/1962 | Billeter | 235—132 |
| 3,089,616 | 5/1963 | Wilson | 235—132 X |
| 3,231,191 | 1/1966 | Berck | 235—132 |

RICHARD B. WILKINSON, *Primary Examiner.*

UNITED STATES PATENT OFFICE
CERTIFICATE OF CORRECTION

Patent No. 3,453,420   July 1, 1969

Charles E. Freese et al.

It is certified that error appears in the above identified patent and that said Letters Patent are hereby corrected as shown below:

Column 3, line 61, "members" should read -- member --. Column 15, line 4, "in" should read -- is --. Column 16, line 3, "2,904,125" should read -- 2,904,251 --.

Signed and sealed this 9th day of June 1970.

(SEAL)
Attest:

Edward M. Fletcher, Jr.   WILLIAM E. SCHUYLER, JR.
Attesting Officer   Commissioner of Patents